W. F. SWEET.
ADDING AND LISTING MACHINE.
APPLICATION FILED OCT. 2, 1915.

1,245,635.

Patented Nov. 6, 1917.
9 SHEETS—SHEET 1.

Inventor
Welcome F. Sweet

W. F. SWEET.
ADDING AND LISTING MACHINE.
APPLICATION FILED OCT. 2, 1915.
1,245,635.
Patented Nov. 6, 1917.
9 SHEETS—SHEET 2.
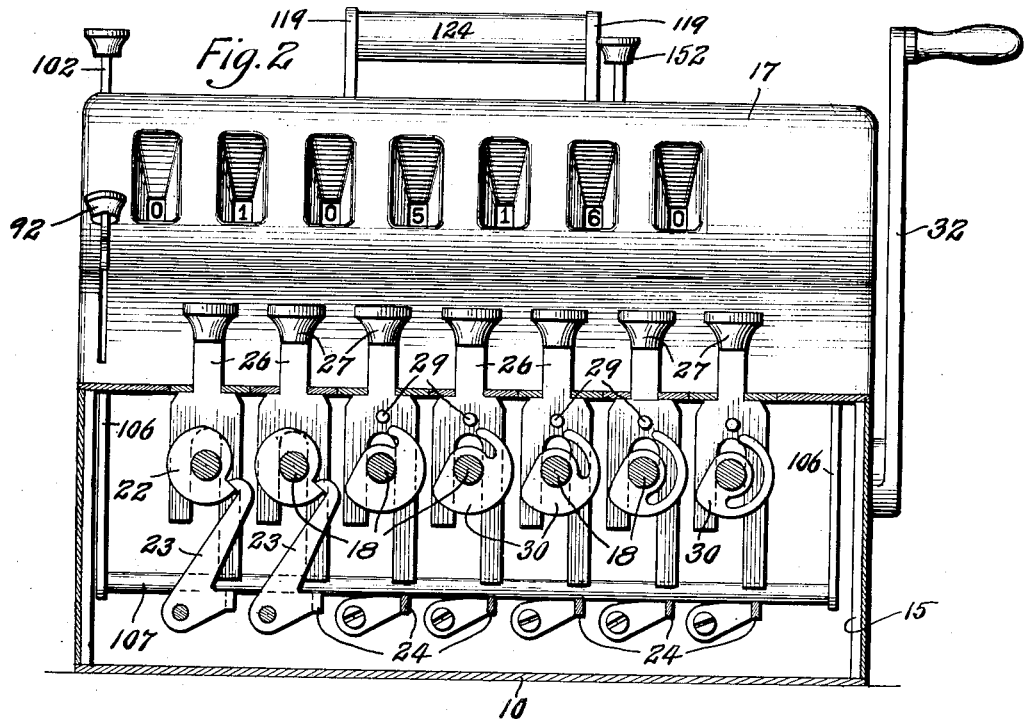
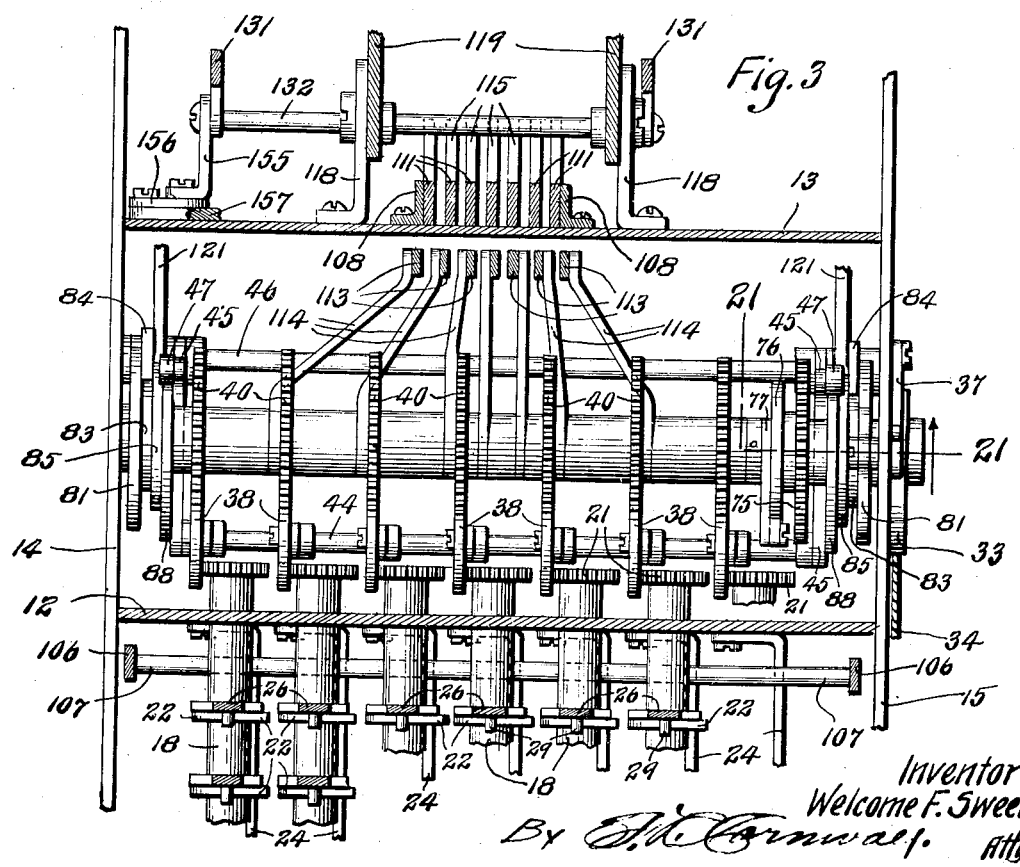
Inventor
Welcome F. Sweet
By T. W. Cornwall, Atty.

W. F. SWEET.
ADDING AND LISTING MACHINE.
APPLICATION FILED OCT. 2, 1915.

1,245,635.

Patented Nov. 6, 1917.
9 SHEETS—SHEET 3.

Inventor
Welcome F. Sweet
By E.H. Cornwall, Atty.

W. F. SWEET.
ADDING AND LISTING MACHINE.
APPLICATION FILED OCT. 2, 1915.
1,245,635.
Patented Nov. 6, 1917.
9 SHEETS—SHEET 4.
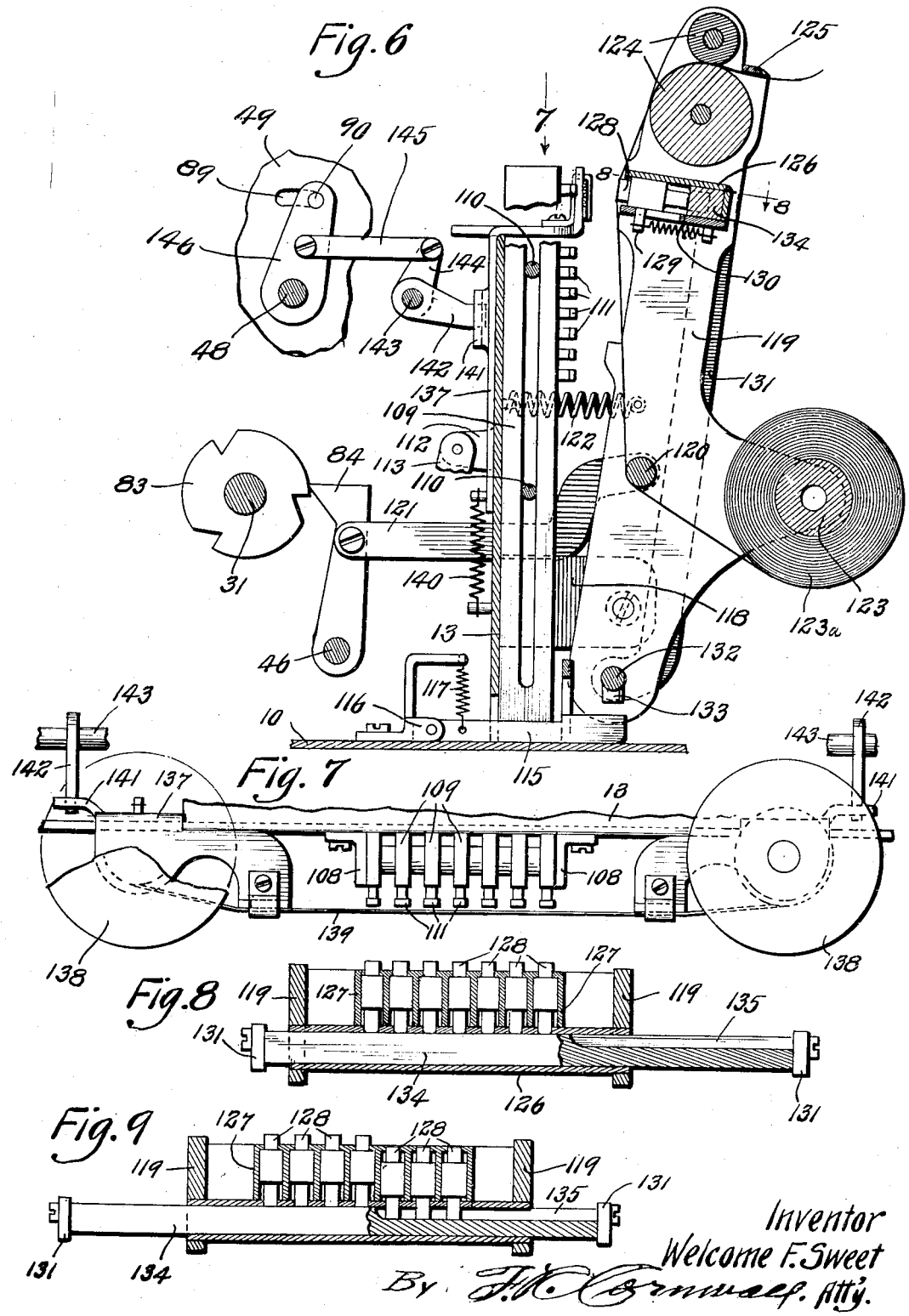
Inventor
Welcome F. Sweet
By F. W. Cornwall, Atty.

W. F. SWEET.
ADDING AND LISTING MACHINE.
APPLICATION FILED OCT. 2, 1915.
1,245,635.
Patented Nov. 6, 1917.
9 SHEETS—SHEET 5.
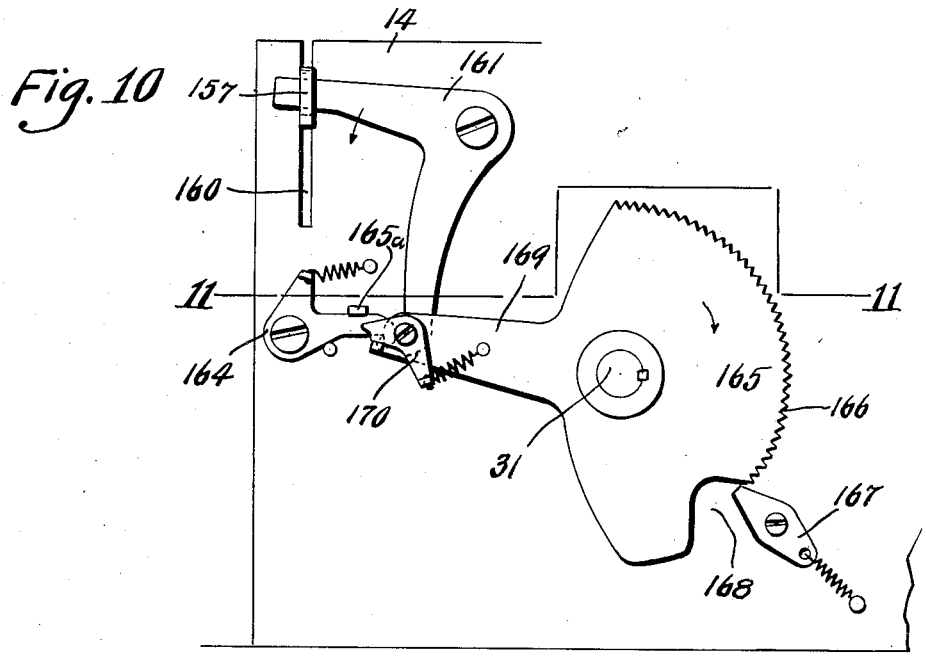
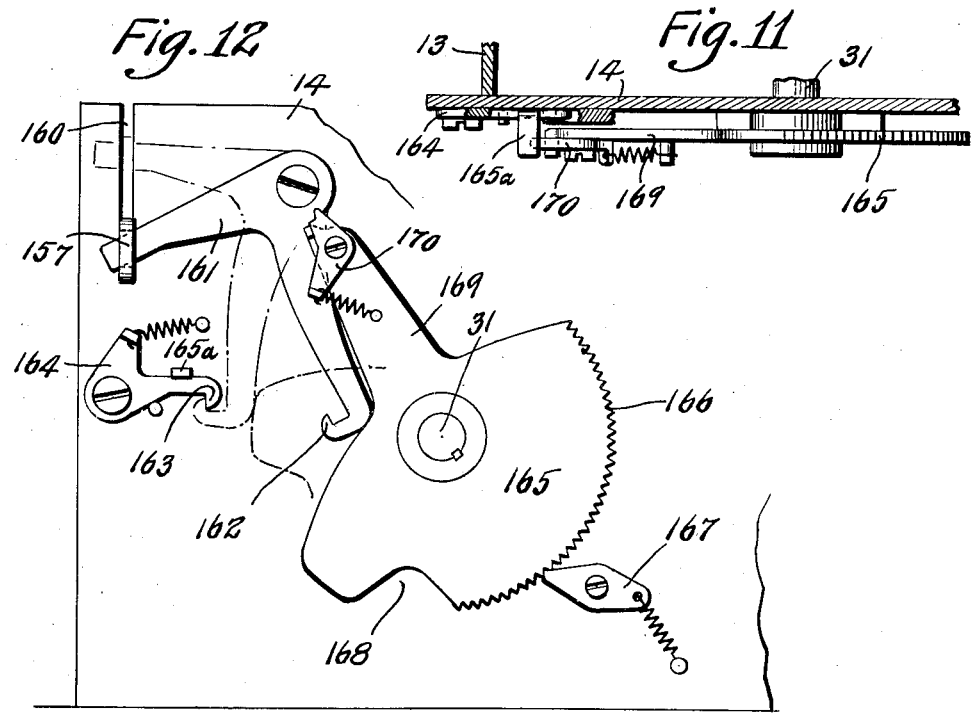
Inventor
Welcome F. Sweet
By J. H. Cornwall, Atty.

W. F. SWEET.
ADDING AND LISTING MACHINE.
APPLICATION FILED OCT. 2, 1915.
1,245,635.
Patented Nov. 6, 1917.
9 SHEETS—SHEET 6.
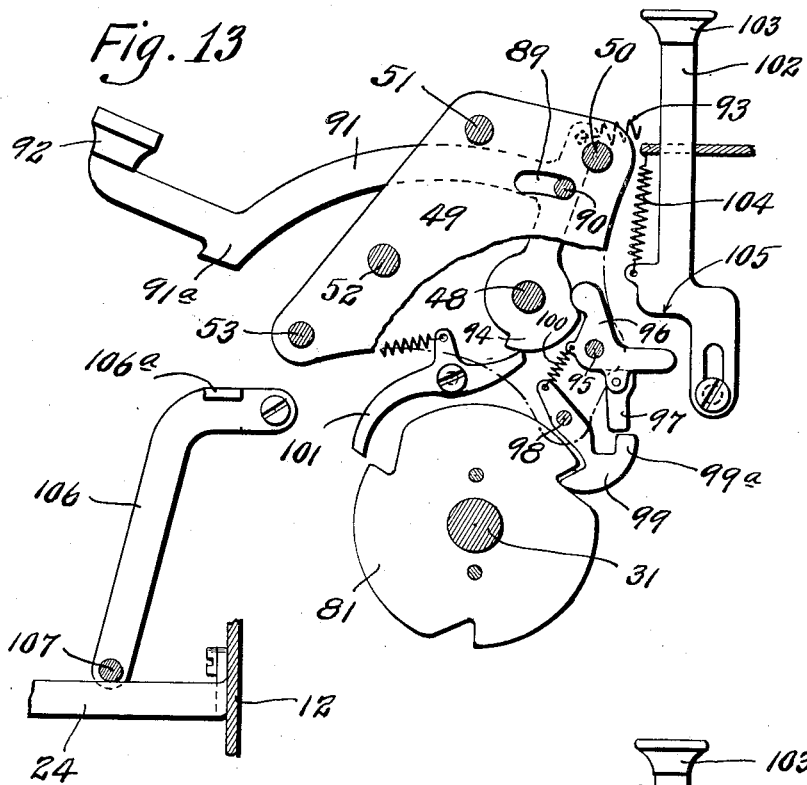
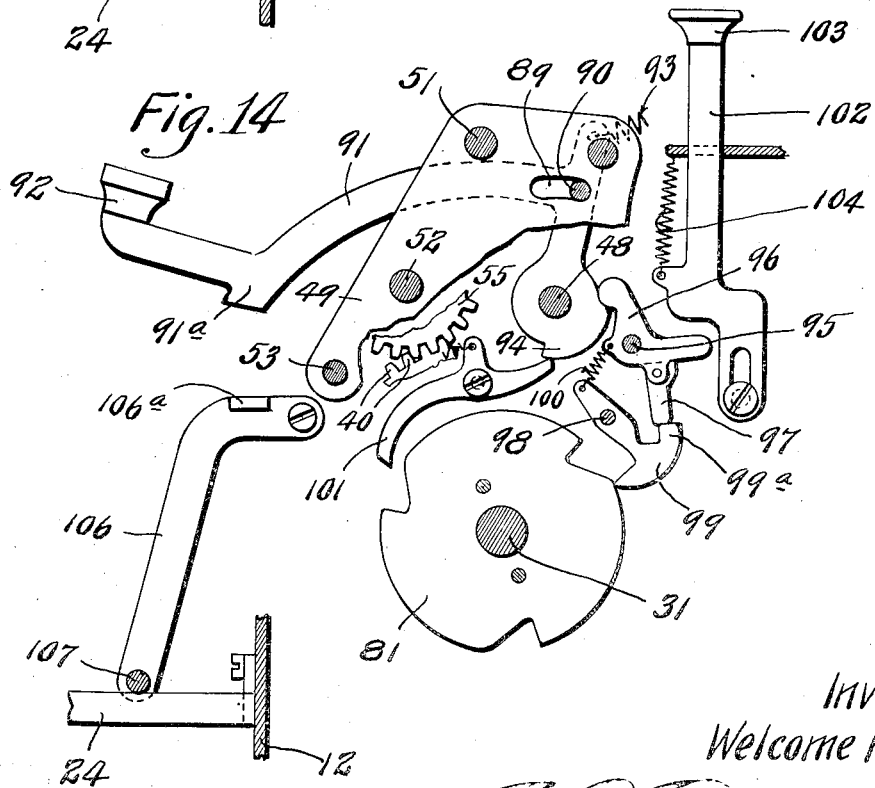
Inventor
Welcome F. Sweet
By J. R. Brunwald, Atty.

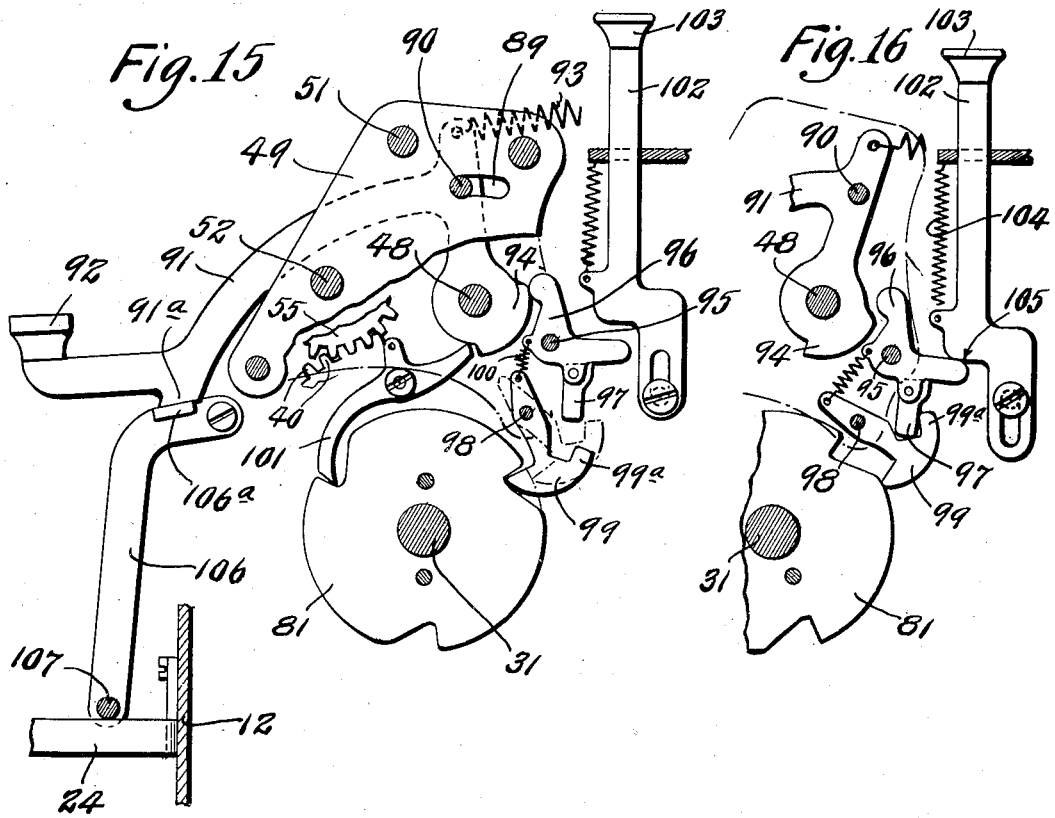

W. F. SWEET.
ADDING AND LISTING MACHINE.
APPLICATION FILED OCT. 2, 1915.
1,245,635.
Patented Nov. 6, 1917.
9 SHEETS—SHEET 8.
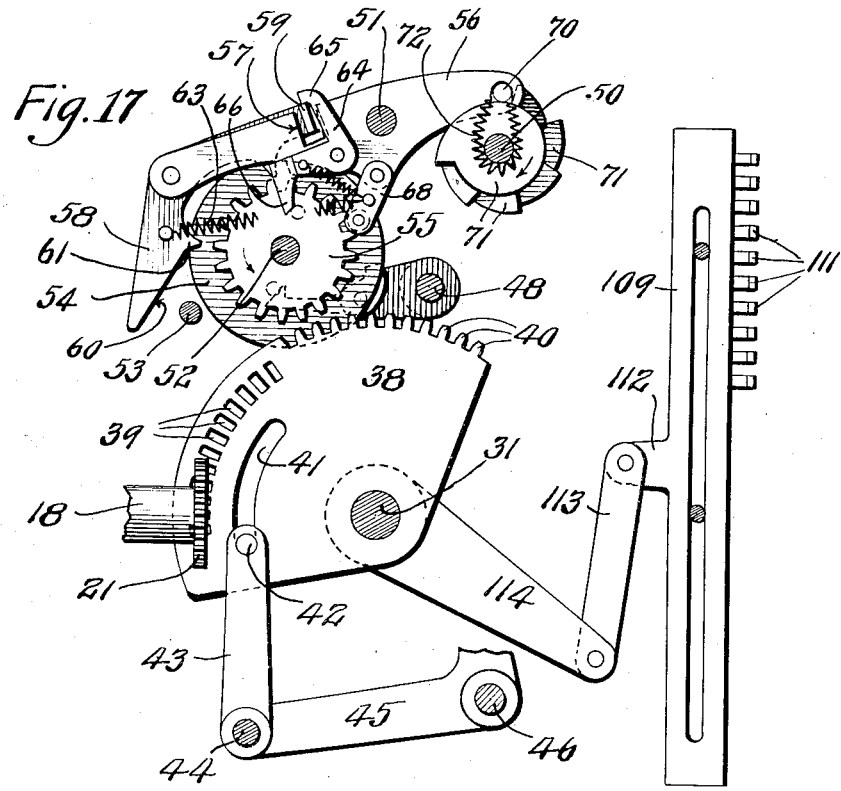
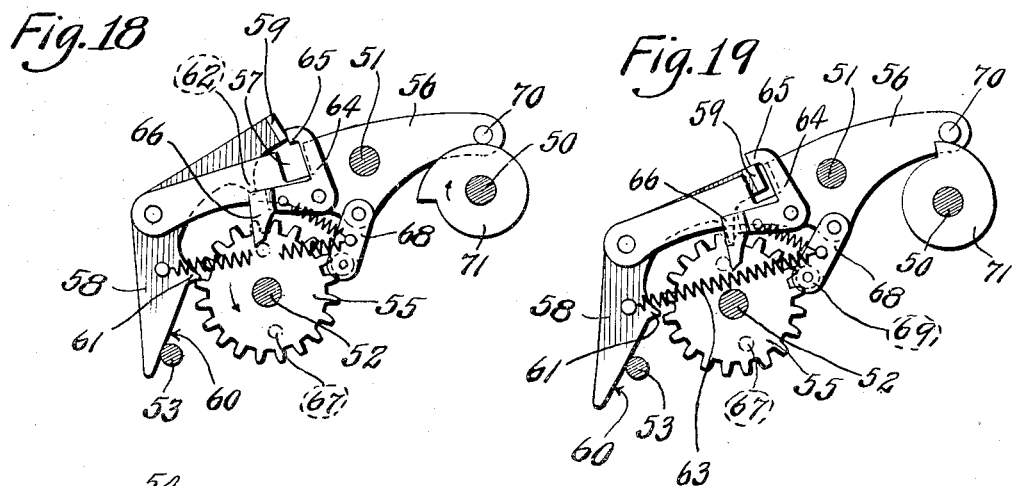
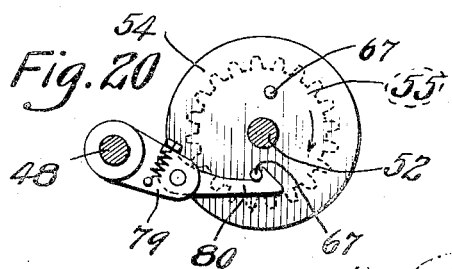
Inventor
Welcome F. Sweet
by  *[signature]*, Atty.

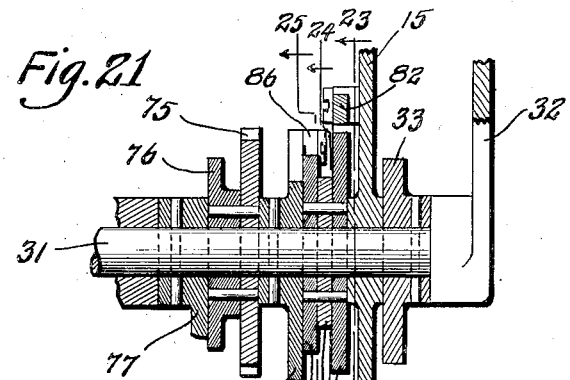
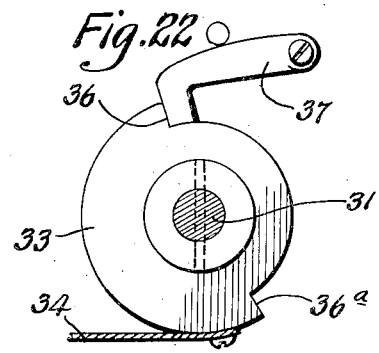
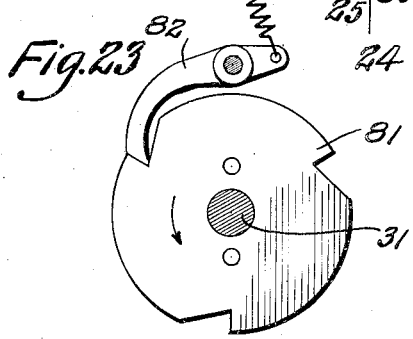
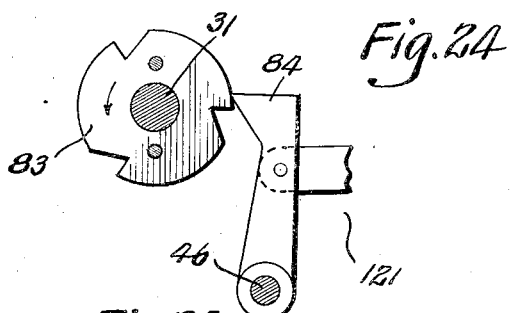
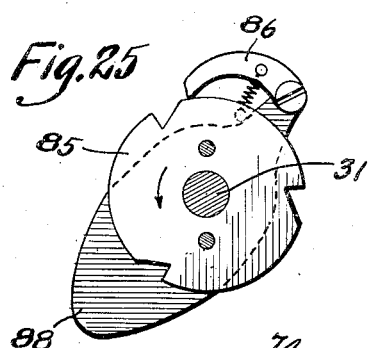
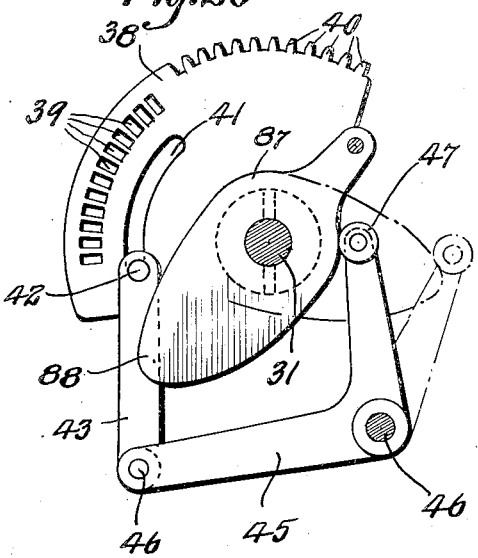
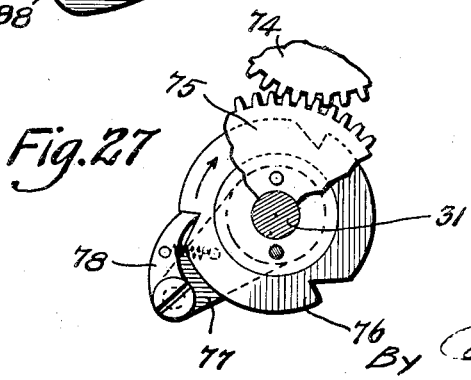

UNITED STATES PATENT OFFICE.

WELCOME F. SWEET, OF RICHMOND, INDIANA, ASSIGNOR TO THE RICHMOND ADDING AND LISTING MACHINE COMPANY, OF RICHMOND, INDIANA, A CORPORATION OF INDIANA.

ADDING AND LISTING MACHINE.

1,245,635.  Specification of Letters Patent.  Patented Nov. 6, 1917.

Continuation of application Serial No. 847,213, filed June 25, 1914. This application filed October 2, 1915. Serial No. 53,745.

*To all whom it may concern:*

Be it known that I, WELCOME F. SWEET, a citizen of the United States, residing at Richmond, Indiana, have invented a certain new and useful Improvement in Adding and Listing Machines, of which the following is a full, clear, and exact description, such as will enable others skilled in the art to which it appertains to make and use the same, reference being had to the accompanying drawings, forming part of this specification.

My invention relates to new and useful improvements in adding and listing machines, the principal objects of my invention being to generally improve upon and simplify the construction of adding and listing machines of the type to which my invention relates, to provide an adding and listing machine which is very compact in general structure and composed of comparatively few parts, thus enabling the machine to be cheaply manufactured and placed on the market at a comparatively low price, and further to provide a machine which is positive in operation and which will accurately add individual items or amounts into an aggregate or total and print said individual items or amounts, and likewise said total.

This application is a continuation of an application for adding and listing machines, filed by me June 25, 1914, Serial No. 847,213.

My improved machine is of that type known as the "full keyboard," that is, said machine is provided with a plurality of series of digit keys, each series being numbered from 1 to 9 inclusive, each key, when depressed, locking the other keys of that series against movement and positioning the parts to represent the digit corresponding to the number on the depressed key, and which digit, when the handle is operated, will be transferred into the accumulating mechanism.

With the foregoing and other objects in view, my invention consists in certain novel features of construction and arrangement of parts, hereinafter more fully described, claimed, and illustrated in the accompanying drawings, in which—

Fig. 2 is a vertical section taken approximately on the line 2—2 of Fig. 1.

Fig. 3 is an irregular horizontal section taken approximately on the line 3—3 of Fig. 1.

Fig. 6 is an enlarged vertical section taken approximately on the line 6—6 of Fig. 5.

Fig. 7 is a plan view of parts of the printing mechanism and the ribbon carrying spools, said view being taken looking in the direction indicated by the arrows 7 in Fig. 6.

Fig. 8 is a horizontal section taken approximately on the line 8—8 of Fig. 6.

Fig. 9 is a sectional view similar to Fig. 8 and showing the printing hammer positioning bar in shifted position.

Fig. 10 is an elevational view of the parts seen looking in the direction indicated by the arrow 10 in Fig. 5.

Fig. 11 is a horizontal section taken approximately on the line 11—11 of Fig. 10.

Fig. 12 is an elevational view similar to Fig. 10, and showing the parts in shifted positions.

Fig. 13 is an enlarged vertical section taken approximately on the line 13—13 of Fig. 4.

Fig. 14 is a sectional view similar to Fig. 13 with the parts shown in shifted position.

Fig. 15 is a sectional view similar to Figs. 13 and 14 with the parts in shifted position.

Fig. 16 is a detail elevational view partly in section of a key and associated parts which are utilized when it is desired to set up and print a number without adding said number into the total.

Fig. 17 is an enlarged vertical section taken approximately on the line 17—17 of Fig. 4.

Figs. 18 and 19 are side elevational views of parts of the mechanism utilized for transferring items or numbers from the setting up mechanism to the accumulating mechanism.

Fig. 20 is a vertical section taken on the line 20—20 of Fig. 4 and showing the zero stop, or mechanism for stopping all of the indicating wheels in zero position.

Fig. 21 is a vertical section taken approximately on the line 21—21 of Fig. 3 and showing a series of cam disks, gear wheels and parts which are carried by the main shaft of the machine.

Fig. 22 is a detail section taken approximately on the line 22—22 of Fig. 21 and showing the means utilized for limiting the movement of the operating handle.

Fig. 23 is a vertical section taken approximately on the line 23—23 of Fig. 21 and showing the retaining cam and its pawl.

Fig. 24 is a vertical section taken approximately on the line 24—24 of Fig. 21 and illustrating the printing cam and the pawl which coöperates therewith.

Fig. 25 is a vertical section taken approximately on the line 25—25 of Fig. 21 and illustrating one of the actuating cams which is carried by the main shaft of the machine.

Fig. 26 is an elevational view of a cam and associated parts, which cam is carried by the main shaft of the machine and utilized for restoring the segments to normal position.

Fig. 27 is a sectional view with parts in elevation, of the carrying-over cam which is operated upon the rear stroke of the handle.

Figure 1:
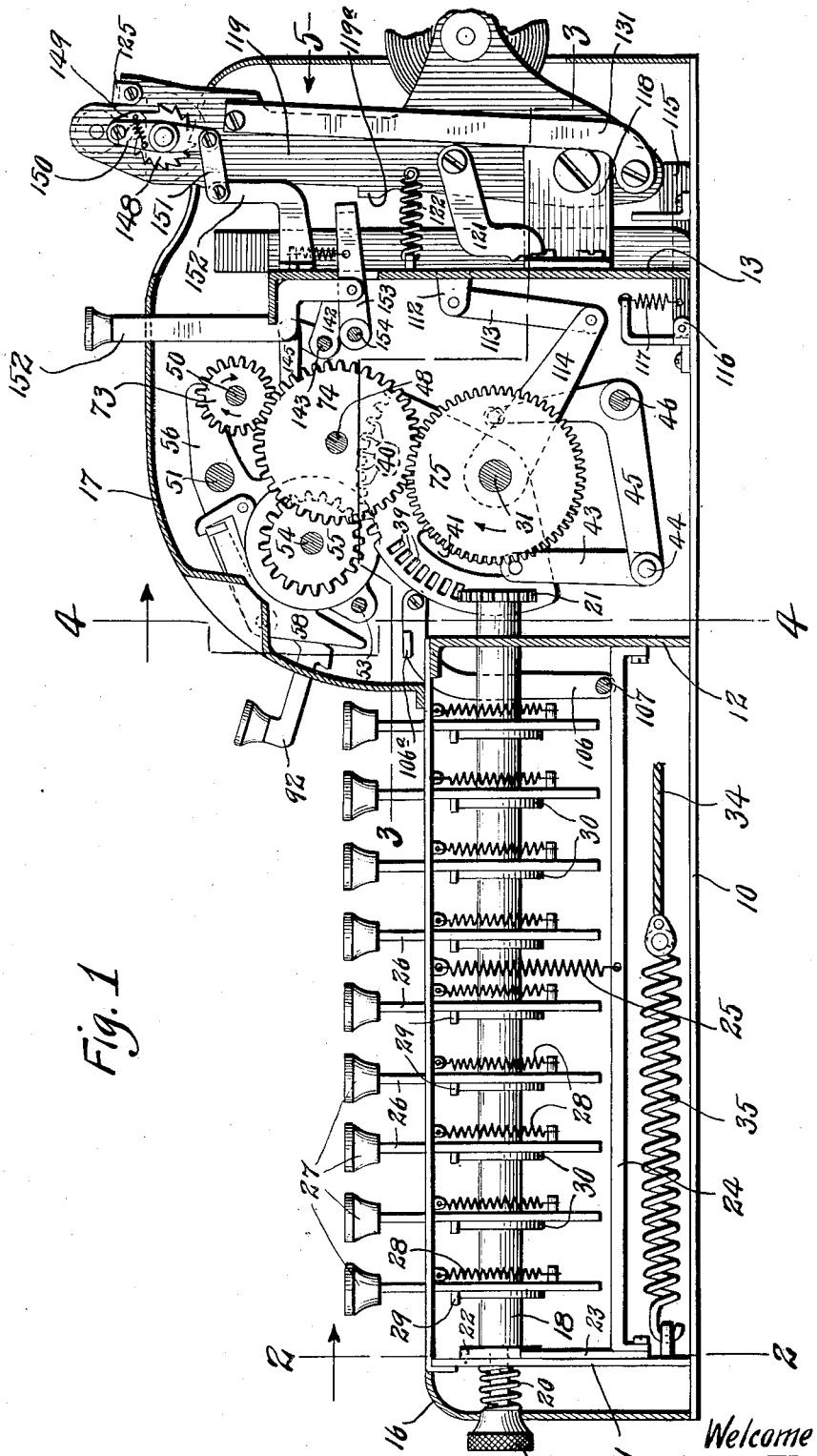
Figure 1 is a vertical section taken lengthwise through the machine at a point adjacent to the right hand side wall of the machine housing.
Figure 4:
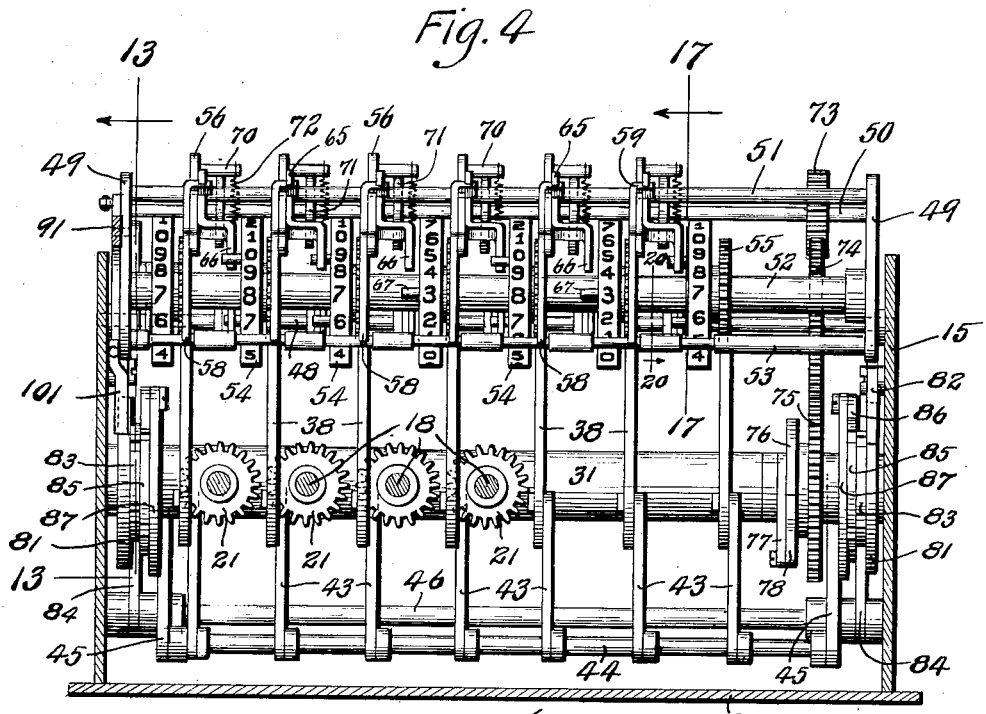
Fig. 4 is a vertical section taken approximately on the line 4—4 of Fig. 1 and with the cover or housing of the machine removed.
Figure 5:
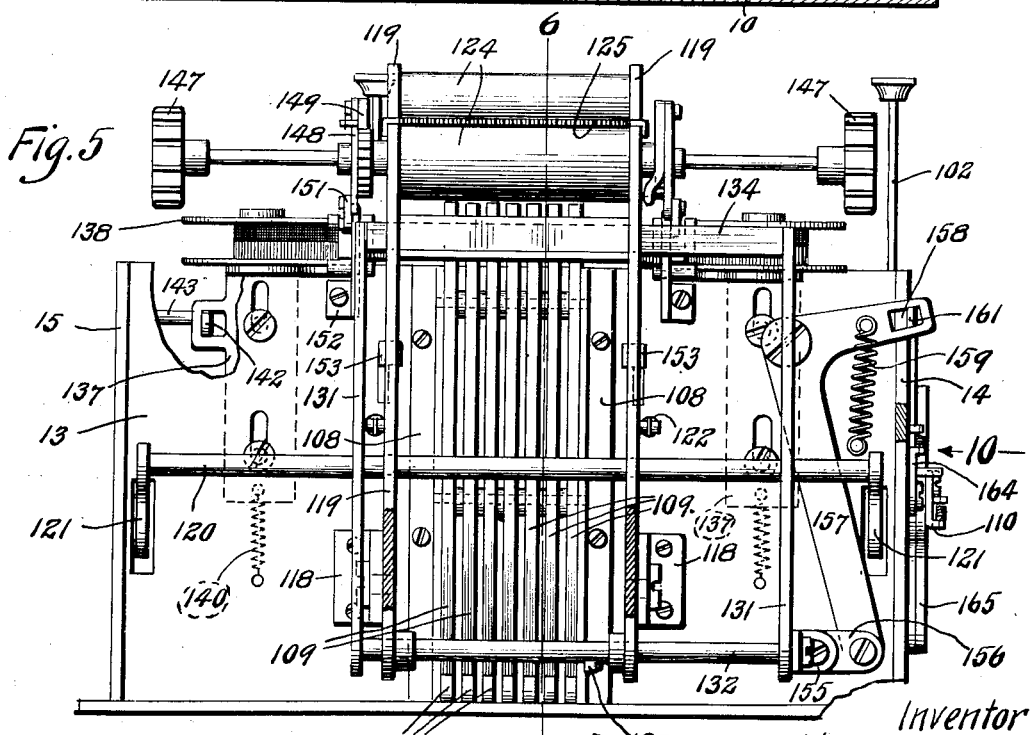
Fig. 5 is a rear elevation of the machine, parts thereof being broken away and in section and with the cover or housing removed.

The frame of my improved machine comprises a base plate 10, a transversely disposed front plate 11, a transversely disposed intermediate plate 12, transversely disposed rear plate 13, left hand side plate 14, and right hand side plate 15.

The housing of the machine comprises two parts 16 and 17, the former inclosing and extending from front plate 11 to intermediate plate 12, and the latter extending from intermediate plate 12 upwardly and over to the rear of rear plate 13.

The space within the housing 16 is occupied by the mechanism which is directly connected to and actuated by the keys of the machine and the space within rear housing 17 is occupied by the adding and printing mechanism and associated parts.

*The setting-up mechanism.*

Journaled in the partitions 11 and 12 is a series of horizontally disposed parallel shafts 18, the forward ends of which project through the front wall of housing 16 and receive milled heads 19.

Mounted on each shaft between the head 19 and front wall 11 is a torsional spring 20 which normally exerts energy to turn said shaft anti-clockwise. The rear end of each shaft projects through partition 12 and carries a pinion 21.

The means for holding each shaft in its normal or zero position and which means is released upon the depression of a key, comprises a shouldered cam 22 which is fixed to the shaft adjacent the inner face of front wall 11.

Engaging the shoulder of each cam is a hook 23, the same being pivotally mounted on the front wall 11 and fixed to the lower portion of each hook is the forward end of a bail 24, the bar of which extends beneath the lower ends of a series of digit keys and the rear end of said bail-piece being pivotally mounted on the partition 12.

Connected to the central portion of each bail and to the top of housing 16 is a retractile spring 25 which serves to maintain said bail in normal elevated position with the corresponding hook 23 against the shoulder of corresponding cam 22.

Operating through the top of housing 16 are the shanks 26 of keys 27, said keys being arranged in rows directly above the shafts 18. The tops of each series or rows of keys bear characters from "1" to "9" inclusive, with the "1" key preferably located at the front of the machine and the "9" key adjacent to the front wall of housing 17.

The lower portion of each key shank is slotted to form legs which straddle the corresponding shaft 18, said shaft being grooved to receive said legs, and thus the keys are guided in their vertical movement. One prong or leg of each key is longer than the other and terminates immediately above the bar of the corresponding bail 24. (See Figs. 1 and 2.)

Each key is normally maintained in elevated position by means of a retractile spring 28. Each key shank is provided with a lateral projection or pin 29 which normally lies in a plane above the arc of movement of a finger, which latter is formed on a disk plate 30, and which latter is fixed on the shaft 18 adjacent to the key shank.

It will be understood that there is a disk for each key and that the length of the slot or space under the finger determines the extent of rotation of the corresponding shaft 18. In Fig. 2 I have shown a number of the disk plates with slots of different lengths.

The operation of the setting-up mechanism just described is as follows.

Assuming the parts to be in normal position, the depression of any key in the series will first position the pin or projection 29 beneath the finger on the corresponding disk 30. The final movement of the depressed key will operate the corresponding bail 24, thereby releasing the corresponding hook 23 from the shoulder of the corresponding cam 22, thus permitting the torsional spring 20 to partially rotate the corresponding shaft 18 in an anti-clockwise direction or until the corresponding pin 29 engages the end of the slot under the finger in disk 30. Thus the shaft is partially rotated and arrested in any one of nine different positions, which latter, of course, depend on the lengths of the slots in the disks 30.

In view of the fact that the pin of the depressed key is beneath the finger of the corresponding disk, said key will be locked in its depressed position while the remaining keys of this particular series will be locked against downward movement by reason of the fact that the fingers of the remaining disks 30 are positioned directly beneath the pins 29.

In the event that an error is made, the milled head 19 may be engaged to rotate the shaft in clockwise direction, thereby releasing the depressed key and permitting any other key in that series to be operated.

It will be understood that an operation of this kind to correct an error must be accomplished before the handle of the machine is pulled.

*The adding mechanism.*

Journaled in side plates 14 and 15 is the main shaft 31 of the machine and fixed on the right hand end thereof outside the housing 17 is a crank handle 32. Fixed on this shaft adjacent to said handle but within the casing is a disk 33 to which is fixed one end of a cable 34, the opposite end being connected to the forward end of a heavy retractile spring 35, the same occupying the lower portion of housing 16 and being connected at its other end to front plate 11.

Disk 33 is provided with two shoulders 36 and 36ᵃ and bearing upon said disk between said shoulders is the point of a pivotally mounted pawl 37. This pawl cooperating with the shoulders 36 and 36ᵃ limits the rotation of shaft 31 in both directions, it being understood that said shaft is actuated by means of crank handle 32.

Loosely mounted on shaft 31 and suitably spaced apart are segments 38, each of which is provided with an arcuate row of apertures 39 which receive the teeth of the corresponding pinion. Formed in the upper rear edge of each segment is a series of teeth 40. Formed in each segment adjacent to the row of apertures 39 is an arcuate slot 41, through which passes a pin 42, the latter being carried by the upper end of a link 43. The lower ends of all these links are engaged by a transversely disposed rod 44 and pivotally connected to the ends of this rod are the forward ends of the horizontally disposed arms of bell cranks 45. These bell cranks are journaled on a transversely disposed shaft 46 and carried by the ends of the vertical arms of said bell cranks are rollers 47. These bell cranks and links are actuated by means hereinafter more fully described to restore the segments 38 to their normal positions.

Supported by the side plates 14 and 15 a short distance above shaft 31 is a shaft 48 on which is loosely mounted a frame comprising a pair of side plates 49 and a series of transversely disposed rods 50, 51, 52 and 53. This entire frame is adapted to rock on the shaft 48 and said frame carries the accumulating wheels, the indicating disks and the parts coöperating therewith.

Loosely mounted on shaft 52 is a series of indicator wheels 54, the peripheries of which are marked with two sets of numerals running from 0 to 9 inclusive.

Conjoined to each indicator wheel is a pinion 55, the same being provided with twenty teeth and each of these pinions is directly opposite a corresponding one of the segments 38. Loosely mounted on the shaft 51 adjacent to each indicating wheel is a plate 56 in the top of which is formed a notch 57, and pivotally mounted on the forward end of each plate is a bell crank 58. The end of one of the arms of this bell crank is bent laterally to form a finger 59 which normally occupies the corresponding notch 57 and the inner face of the lower portion of the opposite arm of said bell crank is inclined as designated by 60 and said inclined face lies immediately in front of rod 53. Formed on the inner face of the arm of this bell crank which is provided with the inclined face is an inwardly projecting lug or tooth 61 which is adapted to engage between a pair of teeth on the corresponding pinion 55 and formed on the other arm of said bell crank to the rear of finger 59 is a downwardly projecting tooth 62, which is also adapted to engage between the teeth of pinion 55.

A spring 63 is connected to each bell crank 58 and tends to pull the lower end thereof toward rod 53 and to move finger 59 out of notch 57.

Pivotally mounted on the side of plate 56 is a spring-held pawl 64, the same being provided with a lug 65 which normally overlies the notch 57 and bears on top of the corresponding finger 59. The other end of this pawl is bent outward away from plate 56 and thence downward to form a finger 66 which is adapted to be engaged by either one of two pins 67, said pins projecting outwardly from the side of the next adjacent indicating wheel.

The mechanism just described provides means for transferring amounts from one order to a higher order in the accumulating mechanism as will be hereinafter more fully described.

Pivotally secured to the underside of each plate 56 is a spring held arm 68 to the lower end of which is journaled a roller 69, said roller being adapted to engage between the teeth of the corresponding pinion 55 and yieldingly hold the same against rotation in either direction.

Projecting laterally from the upper rear end of each plate 56 is a pin 70, the same bearing on the edge of a cam 71. The entire series of cams are carried by shaft 50 and the shoulder of each cam is offset with respect to the shoulders of the other cams.

Connected to each pin 70 is a retractile spring 72, the same extending downward around shaft 50 and normally holding the corresponding pin 70 on the edge of its cam. Fixed on shaft 50 near the right hand end is a pinion 73 and meshing therewith is an idle pinion 74, the latter being loosely mounted on shaft 48. This idle pinion 74 meshes with a pinion 75 which is loosely mounted on shaft 31.

Fixed to said pinion 75 is a cam disk 76, the same being provided with three notches arranged equi-distant apart and fixed on shaft 31 adjacent to this disk is an arm 77, the outer end of which carries a spring held pawl 78, the point of which is adapted to engage the notches in said disk.

The mechanism just described serves to actuate the carrying-over devices, forming a part of the accumulating mechanism, as hereinafter more fully described.

Carried by shaft 48 and adjacent to each indicator wheel is a forwardly projecting arm 79, and pivotally carried by each arm is a spring held detent 80, the hook of which is adapted to engage either one of the pins 67 which project from the corresponding indicator wheel. (See Fig. 20.)

The pins 67 are directly opposite the zeros on the periphery of each indicator wheel and the detent just described provides means for stopping the indicator wheel at the zero point.

Loosely mounted on each end of shaft 31 and just inside each side plate is a cam disk 81, the same being provided with three notches arranged equi-distant apart and adapted to engage in said notches is the point of a spring held pawl 82, the same being pivotally mounted on the adjacent side plate. Fixed to this cam disk is a smaller cam disk 83, the same being provided with three notches arranged equi-distant apart and adapted to engage therein is the point of a pawl 84, the same being pivotally carried by shaft 46. This cam disk and pawl are for the purpose of actuating the printing frame hereinafter more fully described.

Fixed to the disks 81 and 83 is a third cam disk 85, the same being provided with three notches arranged equi-distant apart and adapted to engage therewith is the point of a spring-held pawl 86, which latter is pivotally carried by one end of a cam 87. This cam is fixed on shaft 31 and is provided with a high portion 88 which is adapted to bear against roller 47 carried by bell crank 45. (See Fig. 26.)

It will be understood that a set of the various cam disks as just described are located on the shaft 31 just inside each side plate of the machine and that they are arranged to operate simultaneously.

Formed in the left hand one of the plates 49 and concentric with shaft 48 is an arcuate slot 89 in which is positioned a pin 90, the same being carried by a key lever 91, which latter is loosely mounted on shaft 48. This key lever extends outward through a suitable opening in housing 16 and receives a key 92, said key and key lever being depressed when it is desired to take a total.

Connected to the rear upper portion of lever 91 is one end of a retractile spring 93 which normally holds the frame comprising the plates 49 and shafts 50, 51, 52, and 53 in rearward position, or as illustrated in Figs. 13 and 14.

Formed on the rear lower portion of lever 91 is a lug 94, and loosely mounted on a rod 95 which is carried by plates 49 is a bell crank 96, the upper end of the vertical arm of which bears on the rear lower edge of lever 91 immediately above the lug 94 when said lever is in normal position.

Pivotally connected to the horizontal arm of bell crank 96 is a depending trigger 97. Pivotally mounted on a rod 98 which is positioned below rod 95 is a combined catch and detent 99, the upper end of which is connected to bell crank 96 by a retractile spring 100. The point of this detent is adapted to engage the notches of disk 81 which is located on the left hand side of the machine.

Formed integral with detent 99 is an upwardly projecting lug 99$^a$ which normally engages the lower end of trigger 97. Pivotally mounted on plate 14 above the left hand disk 81 is a double spring-held pawl 101, the lower end of which is adapted to engage the notches in said left hand disk 81 and the upper end of this pawl is adapted to engage behind the shoulder at the forward end of lug 94 when key lever 91 is moved downward in taking a total.

Arranged for vertical movement through the housing 17 to the rear of key 91 is a vertically moving key shank 102, the same carrying on its upper end a key 103 and being normally held in elevated position by means of a retractile spring 104. This key is designated the "non-adding key" inasmuch as it is pressed downward to break a connection in the adding mechanism when it is desired to set up and print a number without adding it into the total. The lower portion of this key shank is provided with a shoulder 105 which normally occupies a position immediately above the outer end of the horizontal arm of bell crank 96. (See Figs. 13, 14 and 16.)

Pivotally connected to the plates 14 and 15 are the upper ends of vertically disposed links 106, the lower ends of which carry a transversely disposed rod 107 which overlies all of the bails 24. The upper portion of the left hand one of these links 106 is provided with a lateral extension 106$^a$ which is adapted to be engaged by a lug 91$^a$, the same being formed on the underside of key lever 91.

The operating of the adding and accumulating mechanism just described is as follows:

When any one of the shafts 18 is rotated by the depression of a key, the corresponding pinion 21 engaging in the apertures 39 of the corresponding segment 38 moves said segment downward, thereby shifting the position of teeth 40 with respect to the teeth of the corresponding pinion 55. In other words, the actuated segment 38 is moved so that the tooth on said segment which corresponds to the number of the key depressed is brought to a point in direct alinement with shafts 31 and 52.

The handle 32 is now engaged by the operator and pulled forward, this movement being regulated by the shoulders 36 and 36$^a$ on disks 33, and which shoulders are engaged by detent 37. This movement rocks shaft 31 and the pawls 86 carried by the upper ends of cams 87 move forward on the surfaces of disks 85 for a distance of approximately fifteen degrees, it being understood that the point of each detent normally rests on the periphery of the corresponding disk a short distance away from one of the notches as shown in Fig. 25. During this fifteen degrees of movement, the item printing mechanism hereinafter more fully described is actuated.

As the handle is thus pulled forward, the pawls 86 will engage in a corresponding pair of notches in the disks 85 and said disks will be rotated a third of a revolution and during the final portion of the movement of the cams 87, the high portion 88 thereof will bear against rollers 47, thereby actuating bell cranks 45 and elevating links 43, and as a result the segment or segments 38 which have previously been partially actuated by means of the depressed key and parts actuated thereby will be reversely moved or restored to their normal positions, and as a result the teeth 40 of the actuated segments engaging with corresponding pinions 55 will partially rotate said pinions, thereby transferring the number which was previously set up by means of the depressed key into the accumulator.

It will be understood that disks 81 are fixed to and move with disks 85 and immediately after the beginning of the movement imparted to the disks 85 as just described, the lower end of pawl 99 will ride out of the notch in the left hand one of the disks 81 in which it has been engaged and the lug 99$^a$ bearing against trigger 97 will rock the frame comprising plates 49 and the various transverse rods 50, 51, 52, 53, etc., so that the rear portion thereof is moved upward and the front portion moved downward, thereby causing all of the pinions 55 to mesh with the teeth 40 of the segments 38. Consequently when the segments which are actuated as heretofore described return to their normal positions, the numbers set up by the depression of the keys will be transferred to the accumulating mechanism.

When the left hand one of the disks 81 completes its third of a revolution, the lower end of pawl 99 drops into another one of the notches in said disk, thereby permitting the accumulator frame to return to its normal position under the influence of retractile spring 93.

The pawl 82 engaging in the notches in right hand disk 81 controls the position of shaft 31 and parts carried thereby and prevents reverse movement of disks 85 and 83. After the handle has thus been pulled forward to transfer the number to the accumulating mechanism, said handle is returned to its normal rearward position under the influence of retractile spring 35, and during this return movement, pawl 78 carried by arm 77 which is fixed to shaft 31 will partially rotate disk 77, thereby partially rotating gear wheel 75, and this movement is transmitted to idle gear wheel 74 and from thence to pinion 73 which is fixed on shaft 50.

Owing to the relative sizes of pinion 73 and gear wheel 74, said pinion 73 makes a complete revolution on the return stroke of the handle, and consequently during this return stroke, the rear end of each arm 56 is elevated by virtue of the engagement of the high portion of the corresponding eccentric 71 with pin 70, said movement being for the purpose of transferring numbers from one order to a higher order. This operation is accomplished in the following manner:

When one of the pins 67 carried by each indicator wheel passes beneath the lower end of finger 66 the corresponding bell crank 64 is actuated, thereby moving lug 65 from its normal position above finger 59, and as a result bell crank 58 is actuated under the influence of its spring and the lower inclined edge 60 of the bell crank thus actuated is brought into position immediately against rod 53 as seen in Fig. 18. When so positioned, lug or tooth 61 bears directly on top of one of the teeth of the corresponding pinion 55.

On the return stroke of the handle, plate 56 will be rocked as hereinbefore described by the engagement of the corresponding one of eccentrics 71 with pin 70, thereby moving the front end of said arm downward, and likewise moving corresponding bell crank 58 downward and simultaneously rocking said bell crank upon its fulcrum. As a result, the corresponding pinion 55 is moved the distance of one tooth by the engagement of lug or tooth 61 and at the same time finger 59 is moved downward into notch 57 and into a position beneath lug 65. (See Fig. 19.)

It will be understood that during this downward movement of the forward end of plate 56, the inclined edge 60 of bell crank 58 rides against rod 53.

The operation of taking a total is as follows:

Total key 92 is depressed and pin 90 carried by the rear portion of arm 91 will strike against the forward end of slot 89 and the continued downward pressure on the total key will rock the frame comprising plates 49 and the rods carried thereby, with the result that pinions 55 will be moved into engagement with the teeth of the corresponding segments 38. Immediately after the pinions are thus moved into mesh with the segments, the depending lug 91$^a$ will strike against ear 106$^a$, thereby moving links 106 downward, and consequently causing rod 107 to bear with pressure downward upon all of the bails 24, with the result that all of the hooks 23 are disengaged from the cams 22 and the torsional springs 20 will now act to rotate shafts 18.

Pinions 21 will actuate the various segments and the teeth of the latter will drive the various pinions 55, the same moving in an anti-clockwise direction until one pin 67 of each pair is engaged by the corresponding pawl 80, and which latter serves as an extra stop.

It will be understood that when total key 92 is moved downward as just described, the point at the upper end of pawl 101 engages behind a shoulder at the lower end of lug 94, thereby locking the total key in depressed position, and when so positioned, the lower point of said pawl 101 occupies one of the notches in left hand disk 81. (See Fig. 15.) Thus the numbers forming the total which was heretofore placed in the accumulating wheels are re-transferred to the segments 38, it being understood that this operation takes place before the forward stroke of the handle which accomplishes the printing of the total and restores the various mechanisms to their normal positions.

The operator now pulls handle 32 forward with the result that the total is printed as hereinafter more fully described, and immediately after this printing operation takes place, left hand disk 81 moves a sufficient distance to shift pawl 101 upon its pivot point, thereby disengaging its upper end from the shoulder behind lug 94, and thus the total key is released and the same, together with the frame comprising plates 49 and rods carried thereby, will ride to their normal position under the influence of spring 93. As the frame thus returns to its normal position, accumulator pinions 55 are disengaged from the teeth of the segments 38 and during the final portion of the forward stroke of the handle, the high portion of restoring cams 87 will actuate bell cranks 45 to restore the segments to their normal positions, and consequently actuating the shafts 18 and setting the same for subsequent operations.

*The non-adding key.*

This key is utilized when it is desired to introduce a number into the machine without transferring it to the accumulating mechanism.

When key 102 is depressed, shoulder 105 strikes against the horizontal arm of bell crank 96, thereby shifting the same so that trigger 97 is offset or out of the path of travel of lug 99$^a$. Consequently when the handle of the machine is pulled to effect the printing of a number set up in the segments, left hand disk 81 will actuate detent 99 without rocking the frame carrying the accumulator wheels inasmuch as the connection between the detent 99 and the trigger 97 is broken. When detent 99 is actuated by disk 81 lug 99$^a$ will pass upward behind trigger 97, as seen in Fig. 16, without imparting rocking movement to the frame carrying the accumulator wheels.

*The printing mechanism.*

Fixed to the rear side of rear plate 13 is a pair of uprights 108, between which are arranged for vertical sliding movement, a series of type carrying bars 109, the same being slotted vertically to receive guide rods 110, the ends of which latter are seated in uprights 108. The upper rear portion of each of these type bars carries a series of rearwardly projecting type-faced members 111, the same bearing the numerals from 0 to 9 inclusive, and reading from the top downward.

Projecting forwardly from each type bar 109 through a vertical slot in rear plate 13 is an ear 112 to which is pivotally connected the upper end of a link 113, and the lower end of each link is connected to the corresponding segment 38 by an arm 114. It will be understood that there is one of these arms fixed to or integral with each segment so that said parts move simultaneously as one piece.

The lower ends of the type bars 109 rest loosely on horizontally disposed fingers 115, the same being pivotally connected at their forward ends to a bracket 116, and connected to each finger near its pivot point is the lower end of a retractile spring 117.

Projecting rearwardly from plate 13 near the lower portions of vertical members 108 are brackets 118, and pivotally mounted thereupon are the main upright frames 119 of the printing frame. Extending through the upright members 119 is a horizontally disposed shaft 120, to the ends of which are pivotally connected forwardly extending links 121 which operate through suitable apertures formed in the rear plate 13 and the forward ends of these links are pivotally connected to the pawls 84 which operate in conjunction with cam disks 83.

Connected to the central portions of upright members 119 are retractile coil springs 122, the same being connected to rear plate 13 and tending to normally pull the printing frame forward.

Journaled between the lower portions of members 119 is a spool 123 which carries a web of paper 123ᵃ on which the items are printed, and said web of paper extends forwardly beneath shaft 120, thence upward between friction rollers 124, the same being journaled between the upper ends of members 119, and said web of paper passes beneath a straight edge 125 which is carried by members 119 and which provides means against which the strip bears when it is being torn off.

Arranged between the upper portions of members 119 is a rectangular housing 126 and projecting forwardly therefrom is a housing 127 provided with a series of compartments in which are arranged for independent movement printing hammers, 128, the forward ends of which normally occupies a position immediately to the rear of the upper row of type-faced members 111 (see Figs. 8 and 9).

Depending from each printing hammer 128 is a pin 129 and connected thereto is one end of a retractile spring 130 which normally tends to draw the printing hammer rearwardly.

The web of paper in passing from spool 123 to friction rollers 124 passes across the faces or outer ends of the printing hammers.

Arranged for transverse sliding movement relative to the printing frame comprising the uprights 119 and parts carried thereby is a frame comprising a pair of uprights 131 the lower ends of which carry a rod 132, which latter is arranged for sliding movement through the lower portions of uprights 119 and fixed to and depending from the central portion of this rod 131 is a stop pin 133, which normally occupies a position immediately above the plane occupied by the rear portions of the pivoted fingers 115. The upper ends of uprights 131 are connected to a bar 134, which latter is provided in its front face with a groove 135 and said bar is arranged for sliding movement in the housing 126.

Arranged for vertical sliding movement upon the inside of rear plate 13 is a pair of vertically disposed plates 137, the upper ends of which extend rearwardly over the top of said plate 13 and the rear ends of said rearwardly extending portions carry spools 138 on which is wound an inking ribbon 139, the upper half thereof being of one color, preferably black, and the lower half being colored red. Normally, the upper or black half of the ribbon occupies a position directly in front of the printing hammers and thus the items introduced into the machine are listed in black but when a total is taken, the plates 137 and parts carried thereby are elevated vertically a short distance, thereby bringing the red portion of the ribbon in front of the printing hammers, and thus the total is printed in red.

Plates 137 are normally held at the lower limit of their movement by retractile springs 140. Projecting outwardly from the upper portion of each plate 137 is a perforated ear 141 and loosely mounted therein are the rear ends of fingers 142, which latter are fixed on a shaft 143, the same being journaled in the side plates 14 and 15. Fixed to this shaft is an upwardly projecting arm 144 to which is pivotally connected the rear end of a link 145, the forward end thereof being pivotally connected to a crank arm 146, which latter is loosely mounted on shaft 48. This crank arm is positioned adjacent to one of the plates 49, and said crank arm is connected to the end of pin 90 which operates through slot 89. Thus, when printing totals, crank arm 146 is swung forward as total key is depressed, thereby rocking shaft 143, and in turn elevating links 137 to bring the red portion of the ribbon directly in front of the printing hammers.

The shaft which carries the lower one of the feed rollers 124 is extended a substantial distance beyond the ends of said roller, and fixed on the ends of said shaft are disks 147, the same having milled edges. Fixed on this shaft adjacent to the right hand upright 119 is a ratchet wheel 148 with which engages the point of a pawl 149 the same being carried by the upper end of a vibrating arm 150. This arm is loosely mounted on the shaft which carries the lower one of the feed rollers and pivotally connected to the lower end of said arm is the rear end of a link 151, the forward end of which is pivotally connected to a bracket 152 which is fixed to the rear upper portion of plate 13. This mechanism provides for the automatic feed of the strip of paper and when the printing frame is actuated, arm 150 will be shifted into an angular position, thereby moving the point of pawl 149 the distance of one tooth upon ratchet wheel 148 and when the printing frame swings back to its normal position away from the type carrying bars arm 150 will be restored to its normal position, during which movement the pawl 149 will move ratchet wheel 148 and the lower one of the feed rollers 124 a short distance, thereby feeding a corresponding amount of paper between said feed rollers.

The non-printing key which is operated when it is desired to introduce a number or a series of numbers into the machine without printing the same, comprises a vertically movable key 152, the upper portion of which projects through the top of housing 17 and the lower end of this key being pivotally connected to a horizontally disposed arm 153, the rear end of which is loosely mounted on a shaft 154. The forward end of this arm is adapted to be moved downward into the path of travel of a lug 119ª which is formed on the rear side of the right hand one of uprights 119.

Fixed to the lower end of the left hand one of uprights 131 is an angle bracket 155 to which is pivotally connected a link 156, and pivotally connected to said link is the lower end of a bell crank 157, the same being fulcrumed to the rear side of plate 13 near the left hand side of the machine, and formed through the end of the horizontal arm of this bell crank is an aperture 158.

Connected to the horizontal arm of this bell crank is the upper end of a retractile spring 159, which normally exerts a downward pull. The outer end of the horizontal arm of this bell crank operates through a vertical slot 160 in left hand plate 14, and projecting through the opening 158 is the end of the horizontal arm of a bell crank 161, which latter is pivotally mounted on the outside of plate 14. The lower end of the vertical arm of this bell crank is provided with a hook 162 which is adapted to be engaged by the hook 163 on the end of a pivotally mounted spring-held detent 164, and which latter is provided with an outwardly projecting lug 165ª.

Fixed on the left hand end of main shaft 31 is a segment 165, the curved edge of which is provided with teeth 166 which are adapted to be engaged by the point of a spring-held pawl 167. This pawl is arranged so as to reverse its position in order that it may engage the teeth 166 from either side, thus providing a full stroke arrangement for the handle 32.

Formed in the lower portion of the segment is a notch 168 which is adapted to receive the point of pawl 167 when said segment is in its normal position.

Formed on or fixed to segment 165 is an arm 169, on the outer end of which is pivotally mounted a spring-held trigger 170, and when the parts are in their normal positions, the point of this trigger occupies a position beneath lug 165 on detent 164. (See Fig. 10.)

The operation of the printing mechanism is as follows:

After the keys 27 have been depressed to introduce a number into the machine as hereinbefore described, handle 32 is pulled forward to transfer the introduced number into the accumulating mechanism, but before this transfer takes place, the introduced number will be printed in the following manner:

When any one of the segments 38 is partially actuated in setting up a number, the corresponding arm 114 will, through link 133, elevate the corresponding one of the type carrying bars 109. As each type bar is elevated, corresponding finger 115 will follow the elevated type bar and the rear portion of said finger will move upward into a position in the path of travel of stop pin 133. Thus, if an item of three numbers is introduced into the machine, the first three type bars 109 will be elevated, and likewise the first three fingers 115 will move upward.

The first portion of the rotary movement imparted to shaft 31 by means of the handle when the same is pulled forward, elevates the outer end of arm 169 which is formed on the segments 165 and which latter is fixed on shaft 31 and the point of trigger 170 strikes against lug 165ª, thereby actuating the detent 164, and as a result, hook 163 will release hook 162 of bell crank 161.

Retractile spring 159 which is under tension immediately acts to pull the horizontal arm of bell crank 157 downward, which movement swings bell crank 161 to the position shown by solid lines in Fig. 12, with hook 162 lying immediately against the underside of arm 169. As bell crank 157 is thus actuated, sliding frame comprising parts 131, 132, and 134 will be moved toward the right hand until stop pin 133 engages against the left hand one of the elevated fingers 115. This action shifts bar 134 through housing 126 to the rear of printing hammers 128 and as groove 135 is brought into position to the rear of the printing hammers a certain number thereof will be permitted to move rearward a short distance under the influence of their springs 130, thus drawing the forward ends of said hammers into the housings 127 as illustrated in Fig. 9.

It will be understood that all of these operations take place on the very first portion of the movement imparted to shaft 31 and before the points of pawls 84 drop into the adjacent notches of cam disks 83.

Immediately after the operations just described take place, the points of pawls 84 drop into the adjacent notches in disks 83, thereby drawing links 121 forwardly a short distance, and consequently drawing the printing frame and parts carried thereby forwardly, which movement is accelerated by the retractile springs 122. As a result, the printing hammers which remain in forward position strike against the horizontal row of type members on the bars 109 which have been elevated, and by reason of the ribbon and the web of paper being between the hammers and type members, the corresponding number which has just been introduced into the machine will be printed on the strip of paper.

As the cam disks 83 continue in their movement which, as heretofore stated, is one-third of a complete revolution, the points of pawls 84 will ride out of the notches into which they have just dropped, thereby swinging the printing frame back to its normal position.

It will be understood that this printing operation takes place prior to the rocking of the frame which carries the accumulator wheels and consequently the printing of each item is effected before such item is transferred to the accumulator.

The continued forward pull of the handle to bring about the transfer of the number to the accumulator causes the lower portion of segment 165 to bear against the under rear side of hook 162, thereby forcing said hook outward into an approximate vertical position as shown by dotted lines in Fig. 12, and this movement actuates bell crank 161 so that bell crank 157 is actuated to return the sliding frame carrying the printing hammer positioned in bar 134 to normal position. As bell crank 161 is thus actuated, hook 162 will be reëngaged by hook 163, thus locking the parts in their normal positions and when shaft 31 is reversely rotated on the return stroke of the handle, the point of trigger 170 will pass lug 165ª, and thus be set for the succeeding releasing movement.

The point of pawl 167 engages teeth 166 during the movement of segment in both directions, in such manner as to enforce a complete movement of the handle in both directions while the machine is being operated.

When printing a total, key 92 is depressed as hereinbefore described to bring the totalizer wheels 55 into engagement with the segments 38 and as the latter are moved by the return of the disks to their zero positions, the corresponding type carrying bars 109 will be elevated and when the handle is pulled to effect the printing operation as just described, the total will be printed on the strip of paper, such total being in red or a distinctive color by reason of the elevation of the ribbon which is brought about in the manner heretofore described.

It will be readily understood that minor changes in the size, form and construction of the various parts of my improved adding machine can be made and substituted for those herein shown and described, without departing from the spirit of my invention, the scope of which is set forth in the appended claims.

I claim:

1. In an adding machine, the combination with a plurality of spring actuated shafts, of means for determining the extent of rotation of each shaft, a pinion on each shaft, a segment constantly in mesh with each pinion, there being a series of teeth on each segment, adding wheels normally out of mesh with the teeth of the segments, and means for entraining said adding wheels with their respective shafts.

2. In an adding machine, the combination with a plurality of spring actuated shafts, of means for determining the extent of rotation of each shaft, a pinion on each shaft, a segment constantly in mesh with each pinion, there being a series of teeth on each segment, adding wheels normally out of mesh with the teeth of the segments, means for entraining said adding wheels with their respective shafts, and means for restoring the segments to their normal positions while the adding wheels are entrained therewith.

3. In an adding machine, the combination with a plurality of spring actuated shafts, of means for determining the extent of rotation of said shafts, a pinion on each shaft, a segment with which each pinion is constantly in mesh, there being a series of teeth on each segment, a rocking frame, adding wheels carried by said frame, and normally out of mesh with the teeth of the segments, and means for rocking said frame so as to entrain the adding wheels with the teeth of their respective segments.

4. In an adding machine, the combination with a plurality of spring actuated shafts, of means for determining the extent of rotation of said shafts, a pinion on each shaft, a segment with which each pinion is constantly in mesh, there being a series of teeth on each segment, a rocking frame, adding wheels carried by said frame and normally out of mesh with the teeth of the segments, means for rocking said frame so as to entrain the adding wheels with the teeth of their respective segments, and means for restoring the segments to their normal positions and actuating said adding wheels while the same are entrained with said segments.

5. In an adding machine, the combination with a plurality of spring actuated shafts, of means for determining the extent of rotation of said shafts, a pinion on each shaft, a segment with which each pinion is constantly in mesh, there being a series of teeth on each segment, a rocking frame, adding wheels carried by said frame and normally out of mesh with the teeth of the segments, means for rocking said frame so as to entrain the adding wheels with the teeth of their respective segments, means for restoring the segments to their normal positions and actuating said adding wheels while the same are entrained with said segments, and means whereby the partial rotary movement of one adding wheel transmits a partial rotary movement to the next adjacent adding wheels.

6. In an adding machine, the combination with spring actuated shafts, of means for determining the extent of rotation of said shafts, a pinion on each shaft, a segment constantly in mesh with each pinion, each of which segments is provided with a series of teeth, adding wheels adapted to be entrained with the teeth of the segments, and means coöperating with said segments whereby the shafts are restored to normal position after operation and while the pinions are entrained with the teeth of the segments.

7. In a machine of the class described, the combination with spring actuated shafts, of means for determining the extent of rotation of each shaft, a pinion on each shaft, a segment constantly in mesh with each pinion, each segment being provided with a series of teeth, a rocking frame, a series of adding wheels carried by said frame and adapted to entrain with the teeth of the segments, means coöperating with the segments whereby the shafts are restored to normal position after each operation and the segments are actuated while the adding wheels are entrained therewith, and means on the rocking frame for progressively transmitting motion from the adding wheels of lowest denomination to the adding wheels of higher denomination.

8. In a machine of the class described, the combination with a plurality of spring actuated shafts, of means for determining the extent of rotation of said shafts, a pinion on each shaft, a segment constantly in mesh with each pinion, each segment being provided with a series of teeth, a rocking frame, a series of adding wheels carried thereby, means for rocking said frame so as to entrain the adding wheels with the teeth of the respective segments, means for restoring the segments to their normal positions, thereby actuating the adding wheels while the same are entrained with said segments, and independently manually operated means for rocking the frame to entrain the pinions with the teeth of the segments.

9. In a machine of the class described, the combination with a series of spring actuated shafts, of means for determining the extent of rotation of said shafts, said means comprising a disk carried by each shaft, each disk being provided with an arcuate slot which is concentric with the corresponding shaft, and a pin movable into the path traversed by said slot, a pinion on each shaft, a segment constantly in mesh with each pinion, said segment being provided with a series of teeth, adding wheels, means for entraining said adding wheels with the teeth of the segments, type carrying bars connected with said segments, and means coöperating with said segments for restoring the same, the shafts, and the type carrying bars to their normal positions.

10. In a calculating machine, the combination with adding wheels, of a type bar controlled by each wheel and movable to print digits at each operation of its controlling wheel, a series of independently operable printing hammers which are normally prevented from operating and a sliding bar controlled by the adding wheels for determining the position of the printing hammers.

11. In a calculating machine, the combination with adding wheels, of a type bar controlled by each wheel and movable to print digits at each operation of its controlling wheel, a series of independently operable printing hammers which are normally prevented from operating a sliding bar controlled by the adding wheels for determining the position of the printing hammers, and means for shifting the position of the sliding bar in proper relation to the position of the type carrying bars.

12. In a calculating machine, the combination with adding wheels, of a type bar controlled by each wheel and movable to print digits at each operation of its controlling wheel, a series of independently operable printing hammers, which are normally prevented from operating, a sliding bar controlled by the adding wheels for determining the position of the printing hammers, means for shifting the position of the sliding bar in proper relation to the position of the type carrying bars, and means for actuating the printing hammers to make a printing impression.

13. In a calculating machine, the combination with adding wheels, of a type bar controlled by each wheel and movable to print digits at each operation of its controlling wheel, a rocking frame, a series of independently operable printing hammers carried by said frame, which hammers are normally prevented from operating, a sliding member controlled by the adding wheels for determining the position of the printing hammers, means for determining the position of the sliding member in proper relation to the position of the type carrying members, and means for actuating the rocking frame to effect a printing impression of the hammers against the type.

14. In a calculating machine, the combination with adding wheels, of a type bar controlled by each wheel and movable to print digits at each operation of its controlling wheel, a rocking frame, a series of independently operable printing hammers carried by said frame, which hammers are normally prevented from operating, a sliding member controlled by the adding wheels for determining the position of the printing hammers, means for determining the proper position of the sliding member in proper relation to the position of the type carrying members, means for actuating the rocking frame to effect a printing impression of the hammers against the type, and a strip of paper carried by said frame and disposed in front of the printing hammers.

15. In a calculating machine, the combination with adding wheels, of a type bar controlled by each wheel and movable to print digits at each operation of its controlling wheel, a rocking frame, a series of independently operable printing hammers carried by said frame, which hammers are normally prevented from operating, a sliding member controlled by the adding wheels for determining the position of the printing hammers, means for determining the position of the sliding member in proper relation to the position of the type carrying members, means for actuating the rocking frame to effect a printing impression of the hammers against the type, a strip of paper carried by said frame and disposed in front of the printing hammers, and means on said frame for imparting intermittent movement to said strip of paper.

16. In a calculating machine, the combination with adding wheels, of a type bar controlled by each wheel and movable to print digits at each operation of its controlling wheel, a rocking frame, a series of independently operable printing hammers carried by said frame, which hammers are normally prevented from operating, a sliding member controlled by the adding wheels for determining the position of the printing hammers, means for determining the position of the sliding member in proper relation to the position of the type carrying members, means for actuating the rocking frame to effect a printing impression of the hammers against the type, and an inking ribbon positioned between the type carrying members and the printing hammers.

17. In a calculating machine, the combination with adding wheels, of a type bar controlled by each wheel and movable to print digits at each operation of its controlling wheel, a rocking frame, a series of independently operable printing hammers carried by said frame, which hammers are normally prevented from operating, a sliding member controlled by the adding wheels for determining the position of the printing hammers, means for determining the position of the sliding member in proper relation to the position of the type carrying members, means for actuating the rocking frame to effect a printing impression of the hammers against the type, an inking ribbon positioned between the type carrying members and the printing hammers, and a strip of paper carried by the frame and disposed in front of the printing hammers.

18. In a calculating machine, the combination with adding wheels, of a type bar controlled by each wheel and movable to print digits at each operation of its controlling wheel, a series of stop fingers which are released by the actuation of the type carrying bars, a sliding frame, a stop pin thereon which is adapted to engage with one of the elevated fingers, and a series of independently movable printing hammers, the positions of which are controlled by a portion of the sliding frame.

19. In a calculating machine, the combination with adding wheels, of a type bar controlled by each wheel and movable to print digits at each operation of its controlling wheel, a series of stop fingers which are released by the actuation of the type carrying bars, a sliding frame, a stop pin thereon which is adapted to engage with one of the elevated fingers, a series of independently movable printing hammers, the positions of which are controlled by a portion of the sliding frame, and means for moving said frame toward the type carrying bars for effecting a printing impression.

20. In a calculating machine, the combination with adding wheels, of a type bar controlled by each wheel and movable to print digits at each operation of its controlling wheel, a series of stop fingers which are released by the actuation of the type carrying bars, a sliding frame, a stop pin thereon which is adapted to engage with one of the elevated fingers, a series of independently movable printing hammers, the positions of which are controlled by a portion of the sliding frame, means for moving said frame toward the type carrying bars for effecting a printing impression, a strip of paper positioned in front of the printing hammers, and an inking ribbon positioned in front of the type carried by the bars.

21. In a calculating machine, the combination with adding wheels, of a type bar controlled by each wheel and movable to print digits at each operation of its controlling wheel, a series of spring-held slidable printing hammers arranged in a row in front of the type carrying bars, and a sliding member positioned to the rear of said printing hammers, which member varies in thickness so as to regulate the positions of said printing hammers.

22. In a calculating machine, the combination with adding wheels, of a type bar controlled by each wheel and movable to print digits at each operation of its controlling wheel, a series of spring-held slidable printing hammers arranged in a row in front of the type carrying bars, a sliding member positioned to the rear of said printing hammers, which member varies in thickness so as to regulate the positions of said printing hammers, and means for determining the position of said sliding member in proper relation to the positions of the type carrying bars.

23. In a calculating machine, the combination with adding wheels, of a type bar controlled by each wheel and movable to print digits at each operation of its controlling wheel, a rocking frame adjacent to the type carrying bars, a housing in said frame, a series of independently movable spring-held printing hammers arranged for operation in said housing, and a printing hammer positioning member arranged for sliding movement in said housing.

24. In a calculating machine, the combination with adding wheels, of a type bar controlled by each wheel and movable to print digits at each operation of its controlling wheel, a rocking frame adjacent to the type carrying bars, a housing in said frame, a series of independently movable spring-held printing hammers arranged for operation in said housing, a printing hammer positioning member arranged for sliding movement in said housing, and means for regulating the position of said sliding member in proper relation to the positions of the type carrying members.

25. In a calculating machine, the combination with adding wheels, of a type bar controlled by each wheel and movable to print digits at each operation of its controlling wheel, a rocking frame adjacent to the type carrying bars, a housing in said frame, a series of independently movable spring-held printing hammers arranged for operation in said housing, a printing hammer positioning member arranged for sliding movement in said housing, means for regulating the position of said sliding member in proper relation to the positions of the type carrying members, and means for imparting movement to the rocking frame to cause the printing hammers to effect a printing impression against the type.

26. In a calculating machine, the combination with adding wheels, of a type bar controlled by each wheel and movable to print digits at each operation of its controlling wheel, a movable housing adjacent to said type bars, a series of independently movable printing hammers arranged for operation within said housing, and a printing hammer positioning member arranged for sliding movement in said housing and bearing directly against said printing hammers.

27. In a calculating machine, the combination with adding wheels, of a type bar controlled by each wheel and movable to print digits at each operation of its controlling wheel, a movable housing adjacent to said type bars, a series of independently movable printing hammers arranged for operation within said housing, and a printing hammer positioning member arranged for sliding movement in said housing and bearing directly against said printing hammers, which sliding member varies in thickness.

28. In a calculating machine, the combination with adding wheels, of a type bar controlled by each wheel and movable to print digits at each operation of its controlling wheel, a movable housing adjacent to said type bars, a series of independently movable printing hammers arranged for operation within said housing, and a printing hammer positioning member arranged for sliding movement in said housing and bearing directly against said printing hammers, which sliding member is provided with two printing hammers bearing faces, the same occupying different planes.

29. In a calculating machine, the combination with adding wheels, of a type bar controlled by each wheel and movable to print digits at each operation of its controlling wheel, a movable housing adjacent to said type bars, a series of independently movable printing hammers arranged for operation within said housing, a printing hammer positioning member arranged for sliding movement in said housing and bearing directly against said printing hammers, which sliding member is provided with two printing hammers bearing faces, the same occupying different planes, and means for moving the housing toward the type carrying members to effect a printing impression.

30. In a calculating machine, the combination with adding wheels, of a type bar controlled by each wheel and movable to print digits at each operation of its controlling wheel, a rocking frame, a series of printing hammers carried by said frame, a frame arranged for sliding movement on said rocking frame, means which is released by the actuation of the type carrying bars for regulating the position of the sliding frame, and means on the sliding frame for regulating the positions of the printing hammers.

31. In a calculating machine, the combination with adding wheels, of a type bar controlled by each wheel and movable to print digits at each operation of its controlling wheel, a rocking frame, a series of printing hammers carried by said frame, a frame arranged for sliding movement on said rocking frame, means which is released by the actuation of the type carrying bars for regulating the position of the sliding frame, means on the sliding frame for regulating the positions of the printing hammers, a strip of paper carried by the rocking frame and passing in front of the printing hammers, and an inking ribbon arranged in front of the type carrying members.

32. In a calculating machine, the combination with adding wheels, of a type bar controlled by each wheel and movable to print digits at each operation of its controlling wheel, a rocking frame, a series of printing hammers carried by said frame, a frame arranged for sliding movement on said rocking frame, means which is released by the actuation of the type carrying bars for regulating the position of the sliding frame, means on the sliding frame for regulating the positions of the printing hammers, a strip of paper carried by the rocking frame and passing in front of the printing hammers, an inking ribbon arranged in front of the type carrying bars, means for effecting an intermittent movement of the strip of paper, and means for changing the vertical position of the inking ribbon.

33. In a calculating machine, the combination with adding wheels, of a type bar controlled by each wheel and movable to print digits at each operation of its controlling wheel, a series of independently operable printing hammers which are normally prevented from operating, and means controlled by the adding wheels for rendering operative all printing hammers up to and including the adding wheel of highest denomination which has been operated, which means includes a sliding bar having a pair of offset printing hammer engaging faces.

34. In a calculating machine, the combination with adding wheels, of a type bar controlled by each wheel and movable to print digits at each operation of its controlling wheel, a series of independently operable printing hammers which are normally prevented from operating, means controlled by the adding wheels for rendering operative all printing hammers up to and including the adding wheel of highest denomination which has been operated, which means includes a sliding bar having a pair of offset printing hammer engaging faces, and key-operated means for controlling the printing action of the hammers which have been rendered operative.

35. In a machine of the class described, the combination with adding mechanism, of type carrying bars associated with and positioned by said adding mechanism, accumulating mechanism with which the adding mechanism is adapted to coöperate, means including a handle for transmitting the items set up in the adding mechanism to the accumulating mechanism, printing mechanism, connections between said printing mechanism and the handle whereby said printing mechanism is operated upon the initial movement of the handle and before the transfer of the items from the adding mechanism to the accumulating mechanism, and means operated by the return movement of the handle for actuating parts of the accumulating mechanism to transfer from an accumulating wheel of one denomination to an accumulating wheel of a higher denomination.

36. In a machine of the class described, a key-board containing digit-keys, a series of digit key operated shafts, pinions on said shafts, segments with which said pinions are constantly in mesh, each segment being provided with a series of teeth, a rocking frame, a series of adding wheels journaled in said frame and adapted to mesh with the teeth of the segments upon the operation of its controlling digit key, a rocking plate carried by the frame adjacent each adding wheel, a spring-held bell crank fulcrumed on each rocking plate, and a tooth on each bell crank, which tooth is adapted to engage with a tooth of the next adjacent adding wheel of highest order to shift the same a distance of one tooth to effect a carry.

37. In a machine of the class described, a key-board containing digit-keys, a series of digit key operated shafts, pinions on said shafts, segments with which said pinions are constantly in mesh, each segment being provided with a series of teeth, a rocking frame, a series of adding wheels journaled in said frame and each adapted to mesh with the teeth of its segment upon the operation of its controlling digit key, a rocking plate carried by the frame adjacent each adding wheel, a spring-held bell crank fulcrumed on each rocking plate, a tooth on each bell crank, which tooth is adapted to engage with a tooth of the next adjacent adding wheel of highest order to shift the same a distance of one tooth to effect a carry, and a detent for normally holding the bell crank in position with its tooth disengaged from the teeth of the adding wheel.

38. In a machine of the class described, a key-board containing digit keys, a series of digit key operated shafts, pinions on said shafts, segments with which said pinions are constantly in mesh, each segment being provided with a series of teeth, a rocking frame, a series of adding wheels journaled in said frame and each adapted to mesh with the teeth of its segments upon the operation of its controlling digit key, a rocking plate carried by the frame adjacent each adding wheel, a spring-held bell crank fulcrumed on each rocking plate, a tooth on each bell crank, which tooth is adapted to engage with a tooth of the next adjacent adding wheel of highest order to shift the same a distance of one tooth to effect a carry, a detent for normally holding the bell crank in position with its tooth disengaged from the teeth of the adding wheel, and means for stopping the adding wheels in zero position when the same are rotated reversely with respect to their rotation during adding movement.

39. In an adding machine, a series of key operated shafts, means for determining the extent of rotation of each shaft, said means comprising a slotted disk carried by the shaft and a pin carried by the shaft operating key, a pinion on each shaft, a shaft arranged to the rear of the first mentioned shafts, a series of segments loosely mounted on the last mentioned shaft, which segments are constantly in mesh with the pinions on the first mentioned shafts, each segment being provided with a series of teeth, a series of adding wheels which are adapted to engage the teeth of the segments, and means adapted to be locked to the single shaft and to move therewith in one direction to restore the segments to their normal positions after they have been actuated by the key operated shafts.

40. In an adding machine, a series of key operated shafts, means for determining the extent of rotation of each shaft, said means comprising a slotted disk carried by the shaft and a pin carried by the shaft operating key, a pinion on each shaft, a shaft arranged to the rear of the first mentioned shafts, a series of segments loosely mounted on the last mentioned shaft, which segments are constantly in mesh with the pinions on the first mentioned shafts, each segment being provided with a series of teeth, a series of adding wheels which are adapted to engage the teeth of the segments, means adapted to be locked to the single shaft and to move therewith in one direction to restore the segments to their normal positions after they have been actuated by the key actuated shafts, a series of type carrying members which are connected to and actuated by said segments, and a row of adjustable printing hammers arranged adjacent to said type carrying members.

41. In an adding machine, a series of key operated shafts, means for determining the extent of rotation of each shaft, said means comprising a slotted disk carried by the shaft and a pin carried by the shaft operating key, a pinion on each shaft, a shaft arranged to the rear of the first mentioned shafts, a series of segments loosely mounted on the last mentioned shaft, which segments are constantly in mesh with the pinions on the first mentioned shafts, each segment being provided with a series of teeth, a series of adding wheels which are adapted to engage the teeth of the segments, means adapted to be locked to the single shaft and to move therewith in one direction to restore the segments to their normal positions after they have been actuated by the key actuated shafts, a series of type carrying members which are connected to and actuated by said segments, a row of adjustable printing hammers arranged adjacent to said type carrying members, and means for actuating the printing hammers to effect a printing impression.

42. In an adding machine the combination of a rotary shaft, a plurality of stop members mounted on said shaft, said stop members having fingers of different lengths, keys, and stops on said keys for coöperating with said fingers.

43. In an adding machine, the combination of a longitudinally extending shaft provided with annular grooves, a guiding plate, and digit keys constituting a series ranging from 1 to 9 and passing through said guiding plate and having portions seated in the annular groove of said shaft.

44. In an adding machine, the combination of a spring actuated shaft, a plurality of stop members mounted on said shaft, said stop members having fingers of different lengths, keys, and stops on said keys for coöperating with said fingers.

45. In an adding machine, the combination of a spring actuated rotary shaft, means for restraining the same against movement, releasing mechanism, including a rocking member extending parallel to said shaft in control of said restraining mechanism, said shaft being provided with a series of annular grooves, and keys in control of said rocking member, which keys are seated in and guided into coöperative relation with said rocking member by the grooves in said shaft.

46. In an adding machine the combination of a spring actuated shaft, a plurality of stop members carried thereby, said stop members having concentrically disposed fingers of different lengths whereby circumferentially displaced stops are provided on the shaft, keys having projections normally occupying the plane above the arcs of movement of said fingers whereby when any one key is depressed its projection will be located below its associated stop finger, and means operated by the depressed key for releasing the shaft and permitting its rotation until one of its stops coöperates with the projection on the depressed key.

47. In an adding machine, the combination of spring actuated shafts, means for determining the extent of rotation of said shafts, said means including a slotted disk on each shaft and a pin carried by the shaft operating key, a gear on each shaft, a segment constantly in mesh with said gear, and means coöperating with said segment whereby said shafts may be restored to normal position after operation.

48. In an adding machine the combination of spring actuated shafts, means for determining the extent of rotation of each shaft, said means including a slotted disk on each shaft and a pin carried by the shaft operating key, a gear on each shaft, a segment constantly in mesh with said gear, and type carrying parts connected with said segments whereby the type in the printing line represents the position of said shafts.

49. In an adding machine, the combination of spring actuated shafts, means for determining the extent of movement of each shaft, a gear on each shaft, a slotted segment constantly in mesh with said gear, a rocking bar and links extending from said bar and provided with studs or pins operating in the slots in said segments for restoring the latter.

50. In an adding machine the combination of a shaft having reduced annuli, a frame plate arranged above the shaft, keys guided by said frame plate, the lower ends of said keys being slotted to engage the reduced portions of the shaft whereby the lower ends of said keys are guided in their movement.

In testimony whereof I hereunto affix my signature in the presence of two witnesses, this 27 day of Sept., 1915.

WELCOME F. SWEET.

Witnesses:
FREDERICK. G. WHITE,
WILFRED JESSUP.